(12) United States Patent
Rühl et al.

(10) Patent No.: US 11,068,013 B2
(45) Date of Patent: Jul. 20, 2021

(54) SYSTEM AND METHOD FOR CONTROLLING A VEHICLE BASED ON A FORCE APPLIED TO A THROTTLE PEDAL

(71) Applicant: AB ELEKTRONIK GMBH, Werne (DE)

(72) Inventors: Stefan Rühl, Erzhausen (DE); Dirk Neubauer, Nachrodt-Wiblingwerde (DE); Roger Möllers, Ascheberg (DE)

(73) Assignee: AB Elektronik GmbH, Werne (DE)

( * ) Notice: Subject to any disclaimer, the term of this patent is extended or adjusted under 35 U.S.C. 154(b) by 50 days.

(21) Appl. No.: 16/512,739

(22) Filed: Jul. 16, 2019

(65) Prior Publication Data

US 2020/0026321 A1    Jan. 23, 2020

Related U.S. Application Data

(60) Provisional application No. 62/701,172, filed on Jul. 20, 2018.

(51) Int. Cl.
*G05G 1/46* (2008.04)
*B60W 30/18* (2012.01)
(Continued)

(52) U.S. Cl.
CPC .............. *G05G 1/46* (2013.01); *B60K 26/02* (2013.01); *B60K 26/021* (2013.01);
(Continued)

(58) Field of Classification Search
CPC ....... F02D 11/00; B60K 26/02; B60K 26/021; B60W 2540/10; B60W 30/18009; B60W 40/06; G05G 1/46; G05G 1/44
See application file for complete search history.

(56) References Cited

U.S. PATENT DOCUMENTS 6,078,860 A * 6/2000 Kerns ................. B60K 31/042
123/399
6,655,199 B1   12/2003 Smith
(Continued)

FOREIGN PATENT DOCUMENTS

CN      108248382       7/2016
DE     102017010341     5/2019

OTHER PUBLICATIONS

PCT International Search Report and Written Opinion for corresponding PCT Application No. PCT/EP2019/069285, dated Oct. 10, 2019, 23 pages.

*Primary Examiner* — Jeremy R Severson
(74) *Attorney, Agent, or Firm* — Dority & Manning, P.A.

(57) ABSTRACT

An electronic pedal assembly may include a pedal platform and at least one force sensor configured to sense a force applied to the pedal platform. One or more control devices may be communicatively coupled to the force sensor(s) and configured to determine a throttle output for controlling the throttle condition of the vehicle based at least in part on the force applied to the pedal platform and based at least in part on an operating condition associated with operating the vehicle. In some embodiments, the force sensor(s) may be configured to measure a force distribution on the pedal platform. The control device(s) may monitor the force distribution and adjust an operation of the vehicle based on the force distribution. The operation of the vehicle can include controlling the throttle condition of the vehicle or an operation that is different from controlling the throttle condition of the vehicle.

18 Claims, 12 Drawing Sheets

(51) Int. Cl.
*B60W 40/06* (2012.01)
*G05G 1/44* (2008.04)
*B60K 26/02* (2006.01)
*F02D 11/10* (2006.01)
*F02D 41/24* (2006.01)

(52) U.S. Cl.
CPC ...... *B60W 30/18009* (2013.01); *B60W 40/06* (2013.01); *F02D 11/105* (2013.01); *F02D 11/106* (2013.01); *F02D 41/2422* (2013.01); *G05G 1/44* (2013.01); *B60W 2520/10* (2013.01); *B60W 2520/105* (2013.01); *B60W 2540/10* (2013.01)

(56) References Cited

U.S. PATENT DOCUMENTS

| | | |
|---|---|---|
| 2009/0112439 A1 | 4/2009 | Kuang et al. |
| 2009/0125199 A1 | 5/2009 | Kaigawa |
| 2011/0271820 A1 | 11/2011 | Cockerell et al. |
| 2011/0282545 A1* | 11/2011 | Karatsinides .......... B60K 23/00 701/36 |
| 2013/0197775 A1 | 8/2013 | Szwabowski et al. |

* cited by examiner

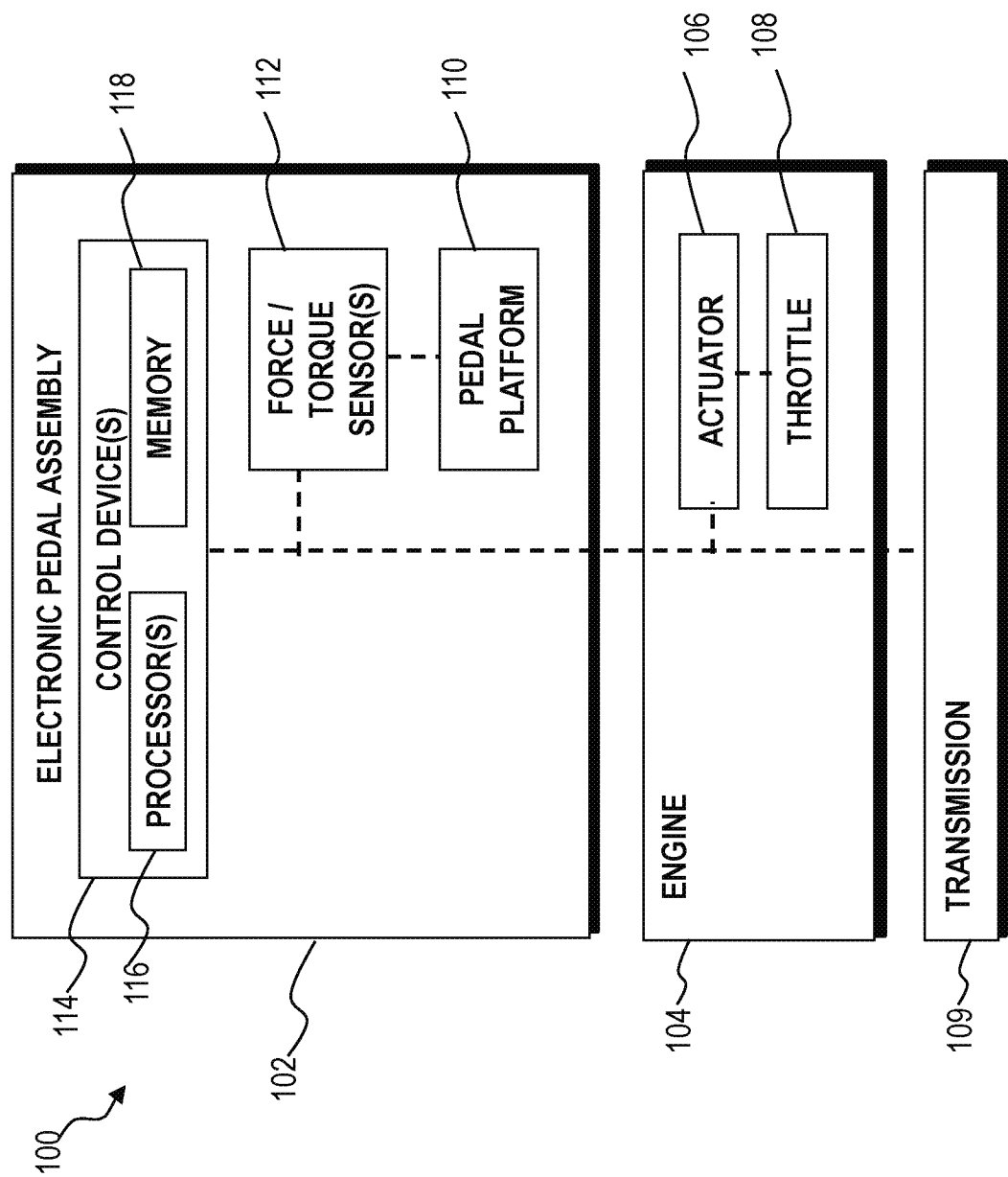

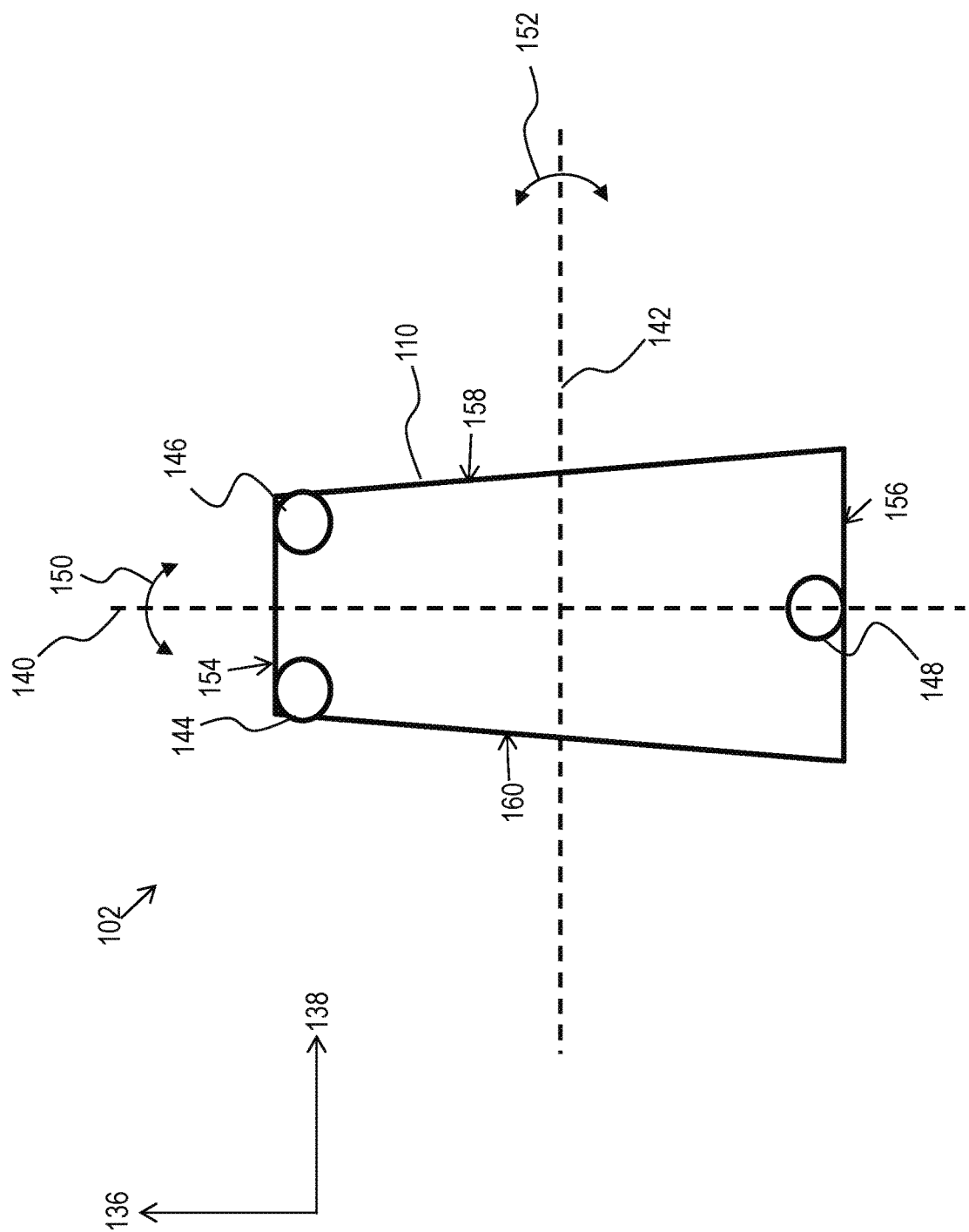

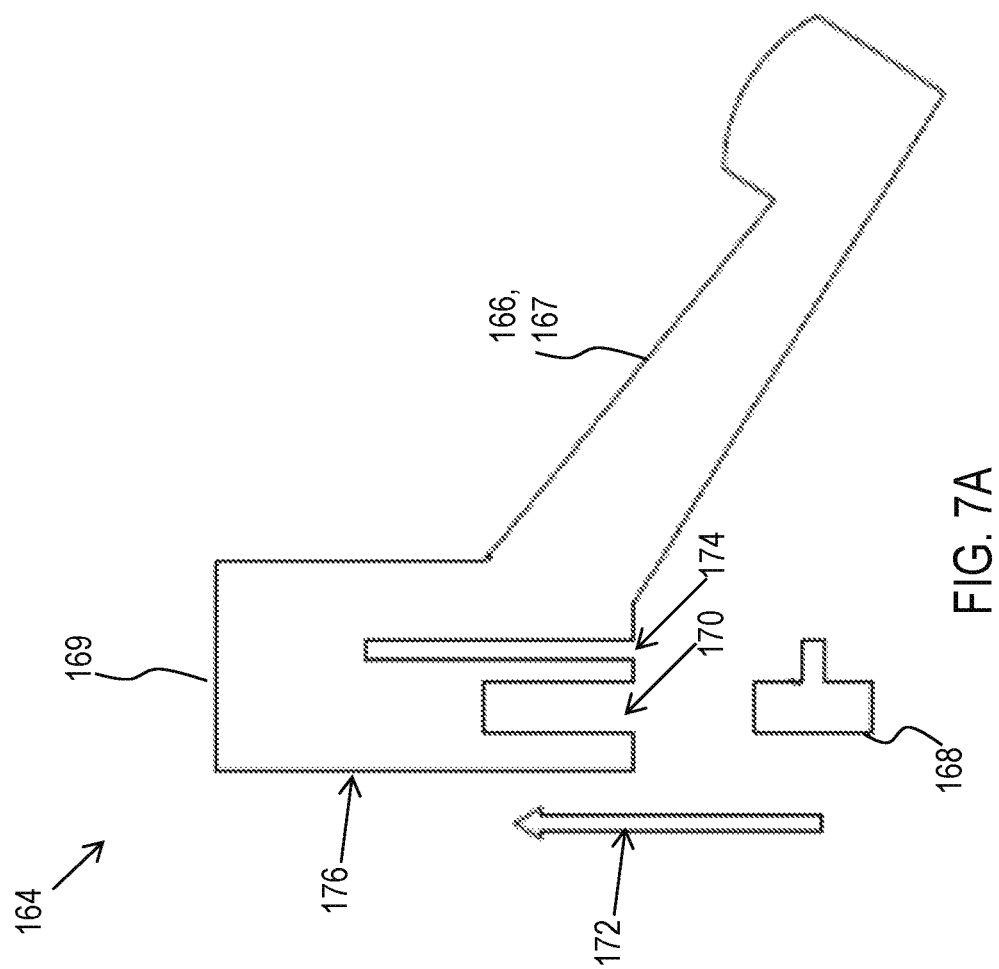

SYSTEM AND METHOD FOR CONTROLLING A VEHICLE BASED ON A FORCE APPLIED TO A THROTTLE PEDAL

RELATED APPLICATIONS

This application claims priority to and the benefit of U.S. Provisional Patent Application No. 62/701,172 filed on Jul. 20, 2018. U.S. Provisional Patent Application No. 62/701,172 is hereby incorporated by reference in its entirety.

FIELD

Example aspects of the present disclosure relate generally to the field of throttle control for a vehicle, for instance, an electronic pedal assembly for controlling a throttle condition of a vehicle based on a force applied to a pedal.

BACKGROUND

Electronic throttle control generally refers to computer-implemented methods for controlling a throttle condition of vehicle by sensing the position a throttle pedal controlling a throttle actuator based on the sensed position information. The throttle actuator controls the operation of the engine and the forward acceleration of the vehicle.

Position-based throttle control, however, can lack responsiveness or become tiring for the driver. For example, when the driver wishes to accelerate, the driver may depress the pedal, which may provide some resistance to being depressed. This resistance can cause a delay between the driver depressing the pedal and the vehicle accelerating. Additionally, the force required to fully depress the pedal and thus provide a maximum throttle output is generally fixed. This lack of adjustability may adversely affect the ergonomics of the pedal system.

Accordingly, an improved method system and related method for controlling the throttle of a vehicle that addresses one or more of the issues identified above would be welcomed in the technology.

SUMMARY

Aspects and advantages of embodiments of the present disclosure will be set forth in part in the following description, or may be learned from the description, or may be learned through practice of the embodiments.

Example aspects of the present disclosure are directed to a system for controlling a throttle condition of a vehicle. An electronic pedal assembly may include a pedal platform and at least one force sensor configured to sense a force applied to the pedal platform. The pedal assembly may include one or more control devices communicatively coupled to the force sensor(s) and configured to determine a throttle output for controlling the throttle condition of the vehicle based at least in part on the force applied to the pedal platform and based at least in part on an operating condition associated with operating the vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 is a simplified schematic illustration of a system that includes an electronic pedal assembly for a vehicle according to aspects of the present disclosure;

FIG. 6 illustrates a simplified schematic top down view of the select portions of the pedal assembly of FIG. 3;

FIG. 7A illustrates a pedal assembly including a force sensor in an unassembled state according to aspects of the present disclosure;

Figure 1:
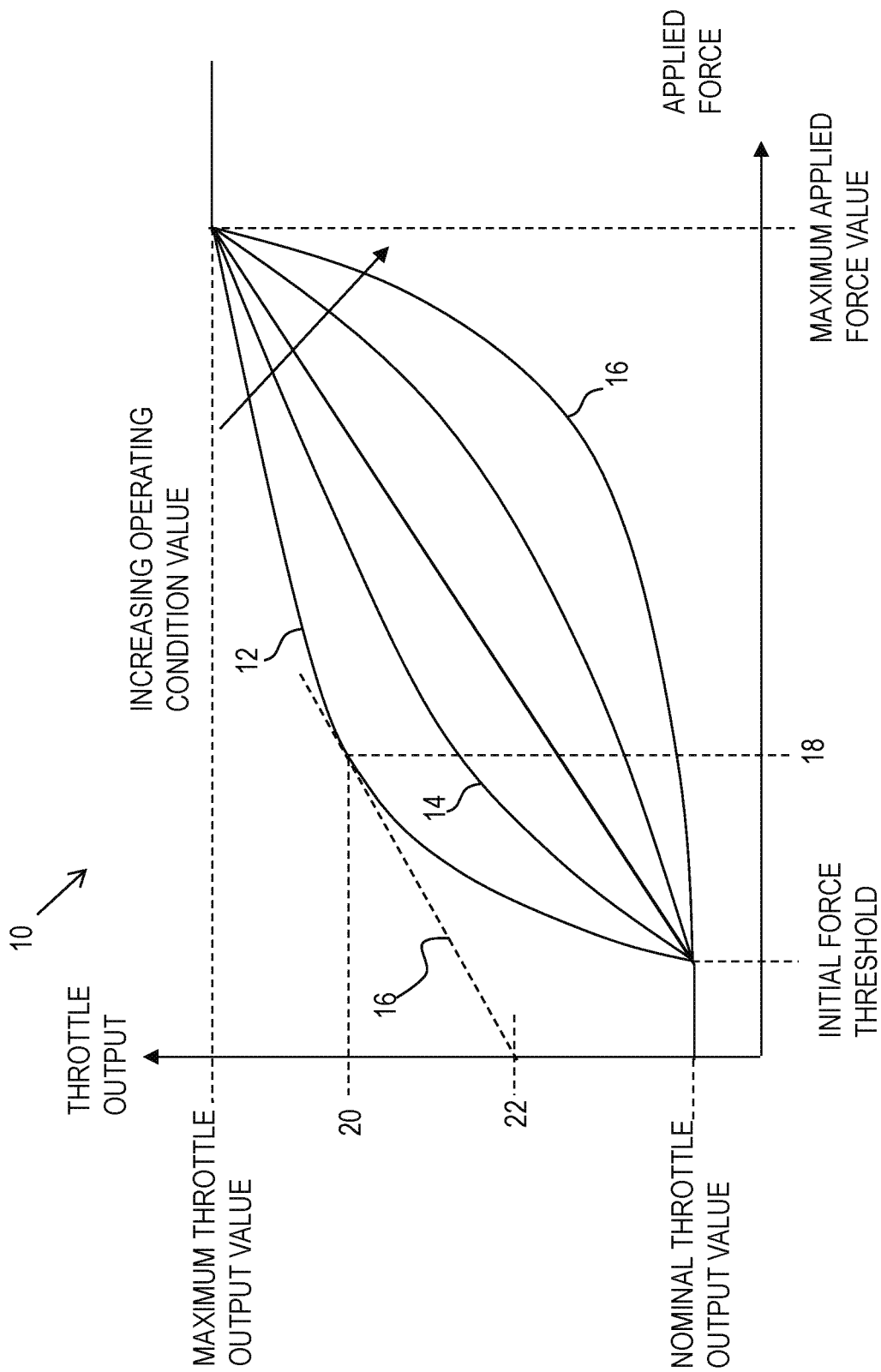
FIG. 1 presents a graph showing example relationships between a throttle output and force applied to a pedal platform of a vehicle.

Repeat use of reference characters in the present specification and drawings is intended to represent same or analogous features or elements of the invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a system and method for controlling a throttle condition vehicle. An electronic pedal assembly may include a pedal platform for controlling the throttle. The electronic pedal assembly may be configured to monitor a force or a force distribution applied to the pedal platform by a foot of the driver of the vehicle. The electronic pedal assembly may control the forward acceleration of the vehicle by controlling the operation of a throttle of an engine of the vehicle and/or the operation of an electric motor of the vehicle. More specifically, the electronic pedal assembly may determine a throttle output that is used to control the forward acceleration of the vehicle. For example, a rate of fuel and/or air supplied to the engine (or the voltage or current applied to the electric motor) may be adjusted based on the throttle output.

The throttle output may be determined based at least in part on the force applied to the pedal platform and based at least in part on an operating condition associated with operating the vehicle. Example operating conditions can include a current acceleration, a current speed, and a current driving mode of the vehicle. As an example, at low speeds, a relatively small force may provide a relatively large forward acceleration (via a large throttle output) to provide a more "sporty" driving experience. Yet at high speeds, a relatively larger force may be needed to provide the same throttle output, which may provide the driver with greater control over the vehicle.

In some embodiments, a hysteresis function may be applied that additionally varies the throttle output based on whether the applied force is currently increasing or decreasing. The hysteresis function may further vary the throttle output based on an operating condition of the vehicle. The operating condition of the hysteresis function may be the same as or different from the initial throttle calculation described above. For example, a parameter of the hysteresis function may vary based on a current acceleration of the vehicle, while the initial throttle determination may vary based on a current speed of the vehicle.

In some embodiments, the electronic pedal assembly may be configured to control an operation of the vehicle based on aspects of a force distribution (e.g., a two-dimensional force distribution) applied to the pedal platform. For example, in response to a force distribution that is concentrated towards a forward end of the pedal platform (e.g., under the toes of the driver), the electronic pedal assembly may cause a transmission of the vehicle to shift gears (e.g., to a higher gear). As another example, in response to a force distribution that is concentrated towards a side of the pedal platform, the electronic pedal assembly may active a turn signal. Various other operations of the vehicle may be controlled based on the force distribution. The electronic pedal assembly may also be configured to perform other features based on the applied force and/or one or more operating conditions of the vehicle, for example as described herein.

Example aspects of the present disclosure are directed to an electronic pedal assembly for controlling a throttle condition of a vehicle. The electronic pedal assembly may include a pedal platform and at least one force sensor configured to sense a force applied to the pedal platform. The electronic pedal assembly may also include one or more control devices communicatively coupled to the at least one force sensor and configured to determine a throttle output for controlling the throttle condition of the vehicle based at least in part on the force applied to the pedal platform and based at least in part on an operating condition associated with operating the vehicle.

In some embodiments, the operating condition may include at least one of a current speed of the vehicle, a current acceleration of the vehicle, a current road condition, or a driving mode of the vehicle.

In some embodiments, the control device(s) may be further configured to compute at least one of a gain or an offset that relates the monitored force with the throttle output to determine the throttle output. The gain or offset may vary with the operating condition.

In some embodiments, the control device(s) may further configured to determine the throttle output based at least in part on a monotonous function.

In some embodiments, the control device(s) may be further configured to apply a hysteresis function to determine the throttle output. In some embodiments, the control device(s) may be further configured to vary at least one parameter associated with the hysteresis function based on at least one of the operating condition or an additional operating condition.

In some embodiments, the force sensor(s) may be configured to measure a force distribution on the pedal platform. The control device(s) may be further configured to adjust a second operation of the vehicle based on the force distribution on the pedal platform. The second operation may be different from controlling the throttle condition of the vehicle. The second operation may include one or more of the following: providing an input to an autonomous driving system; adjusting a driving mode of the vehicle; shifting a gear of a transmission of the vehicle; applying a brake of the vehicle; or activating a turn signal.

In some embodiments, the force sensor(s) may include at least one of the following: a pair of force sensors spaced apart in at least one of a longitudinal direction or a lateral direction with respect to the pedal platform; or a torque sensor configured to sense a torque about at least one of a longitudinal axis or lateral axis of the pedal platform.

In some embodiments, the control device(s) may be further configured to selectively apply a threshold function to the monitored force to determine the throttle output. The threshold function may include defining a constant throttle force range and causing the throttle output to remain substantially constant while the applied force is within the constant throttle force range.

In some embodiments, the control device(s) may be further configured to adjust a second operation of the vehicle based on variations of the monitored force that are within the constant throttle force range. The second operation may be different from controlling the throttle condition of the vehicle. For example, second operation can include one or more of the following: providing an input to an autonomous driving system, adjusting a driving mode of the vehicle, shifting a gear of a transmission of the vehicle, applying a brake of the vehicle, or activating a turn signal. In some embodiments, the control device(s) may be further configured to select the nominal force value based on a driver input.

One example aspect of the present disclosure is directed to an electronic pedal assembly for a vehicle comprising. The electronic pedal assembly may include a pedal platform having a longitudinal direction and a lateral direction. The electronic pedal assembly may also include at least one force sensor configured to measure a force distribution with respect to at least one of the longitudinal direction or the lateral direction on the pedal platform. The control device(s) may be communicatively coupled to the force sensor(s) configured to monitor the force distribution on the pedal platform with respect to at least one of the longitudinal direction or the lateral direction by receiving signals from the force sensor(s) and adjust an operation of the vehicle based on the force distribution on the pedal platform.

In some embodiments, the operation of the vehicle may include providing an input to an autonomous driving system, adjusting a driving mode of the vehicle, shifting a gear of a transmission of the vehicle, applying a brake of the vehicle, and/or activating a turn signal based on aspects of the force distribution. In some embodiments, the operation of the vehicle may include determining a throttle output for controlling a throttle condition of the vehicle.

In some embodiments, the control device(s) may be further configured to determine the throttle output based additionally on a current operating condition of the vehicle. The current operating condition of the vehicle may include a current speed of the vehicle, a current acceleration of the vehicle, a current road condition, or a current driving mode of the vehicle.

In some embodiments, the force sensor(s) may include a pair of force sensors that are spaced apart in at least one of the longitudinal direction or the lateral direction of the pedal platform.

In some embodiments, the force sensor(s) may include a torque sensor configured to sense a torque about at least one of a longitudinal axis extending in the longitudinal direction or a lateral axis extending in the lateral direction of the pedal platform.

FIG. 1 is a graph 10 showing example relationships between the throttle output and the applied force. The throttle output may generally increase with greater applied force, such that the driver can increase the throttle output by applying a greater force to the pedal platform. An initial force threshold may be defined, below which the throttle output is equal to a nominal throttle output value, for example a throttle output value appropriate for idling. Similarly, a maximum throttle output value may be defined as the largest throttle output produced by the system. The maximum throttle output value may generally be produced in response to a force that is equal to or greater than the maximum applied force. In some embodiments, the maximum applied force may be adjustable, for example, according to user input. For instance, the maximum applied force may be set by the user by entering a settings mode and applied the desired maximum applied force to the pedal.

The relationship or "mapping" between the throttle output and the applied force may vary with an operating condition of the vehicle. Several example operating conditions include a current speed of the vehicle, a current acceleration of the vehicle, a current road condition, or a driving mode of the vehicle. As used herein, "operating condition" may include any suitable parameter or characteristic of an operation of the vehicle that is sensed or monitored by a control device associated with the vehicle.

In the example relationship depicted in FIG. 1, the curved lines may represent a relationship between the throttle output and the applied force for a constant operating condition value. As the value of the operating condition increases during operation of the vehicle, the relationship may change. For example, a first relationship curve 12 may be defined for a first operating condition value. A second relationship curve 14 may be defined for a second operating condition value that is greater than the first operating condition value, and so on until a last relationship curve 16 for a last operating condition value.

In some embodiments, the operating condition(s) may include the current acceleration of the vehicle. The relationship between the throttle output and the applied force may transition from the first relationship curve 12 to the last relationship curve 16 as the current acceleration of the vehicle increases. This may provide a more responsive or "sporty" feel when the current acceleration is relatively low as a small increase in the applied force may produce a relatively large increase in the throttle output. At higher current acceleration values, however, the same increase in the applied force may produce a smaller increase in the throttle output. This may provide the driver with greater control over applying additional throttle (and thus additional acceleration) when the vehicle is already accelerating at a substantial rate.

In some embodiments, the operating condition(s) may include the current acceleration of the vehicle. This configuration may provide similar benefits as the embodiment described above in which the operating condition includes the current acceleration.

In some embodiments, the operating condition may include a driving mode of the vehicle. For example, the driver may select "sport" mode, "comfort" mode, or "economy mode", for example, as desired. In other embodiments, the operating condition may include a current road condition. For example, when rough road conditions are detected, the relationship between the applied force and throttle output vary in a manner that provides better performance and/or control over the vehicle. Various other operating conditions may include a seat position setting, ground/vehicle inclination, outdoor temperature, engine temperature, and the like.

In some embodiments, the relationship(s) between the throttle output and applied force may be defined in a form similar to the standard equation for a line: y=mx+b. The slope, m, the offset, b, or both may be defined as functions of the operating condition. Referring to FIG. 1, a current tangent line 16 may be defined for a current applied force 18, a current throttle output 20, and a current operating condition value (corresponding to the first relationship curve 12). The current tangent line 16 may have a current slope and a current offset 22. The current slope may be defined as the slope of the current tangent line 16, and the current offset 22 may be defined as the intersection of the current offset 22 with the throttle output axis.

In some embodiments, relationship(s) between the throttle output and applied force may be defined as follows:

$$U(F,C)=m(C)\cdot F+b(C) \qquad (1)$$

where F represents the applied force, C represents the operating condition value, U(F, C) represents the throttle output, m(C) represents the current slope of the throttle output with respect to the applied force (e.g., the slope of the tangent line 16), and b(C) represents the current offset of the throttle output with respect to the applied force (e.g., the offset 22 of the tangent line 16). When the applied force and/or operating condition is changed, the current slope and/or current offset may be adjusted accordingly. It should be understood that in some embodiments, one of the current slope or current offset may be defined as a function of the operating condition value while the other may be a constant value. The function(s) defining the current slope and/or current offset can be selected based on the desired response characteristics of the system.

In some embodiments, the relationship between the applied force and the throttle output may be described by a monotonous or monotonic function. A monotonous function is a function that is entirely non-increasing or non-decreasing. The relationship between the applied force and the throttle output may generally be described as a non-decreasing monotonous function. Non-decreasing monotonous function are defined as function having an output that increases or remains constant in response to an increase in input, for example as shown in FIG. 1.

Figure 2A:
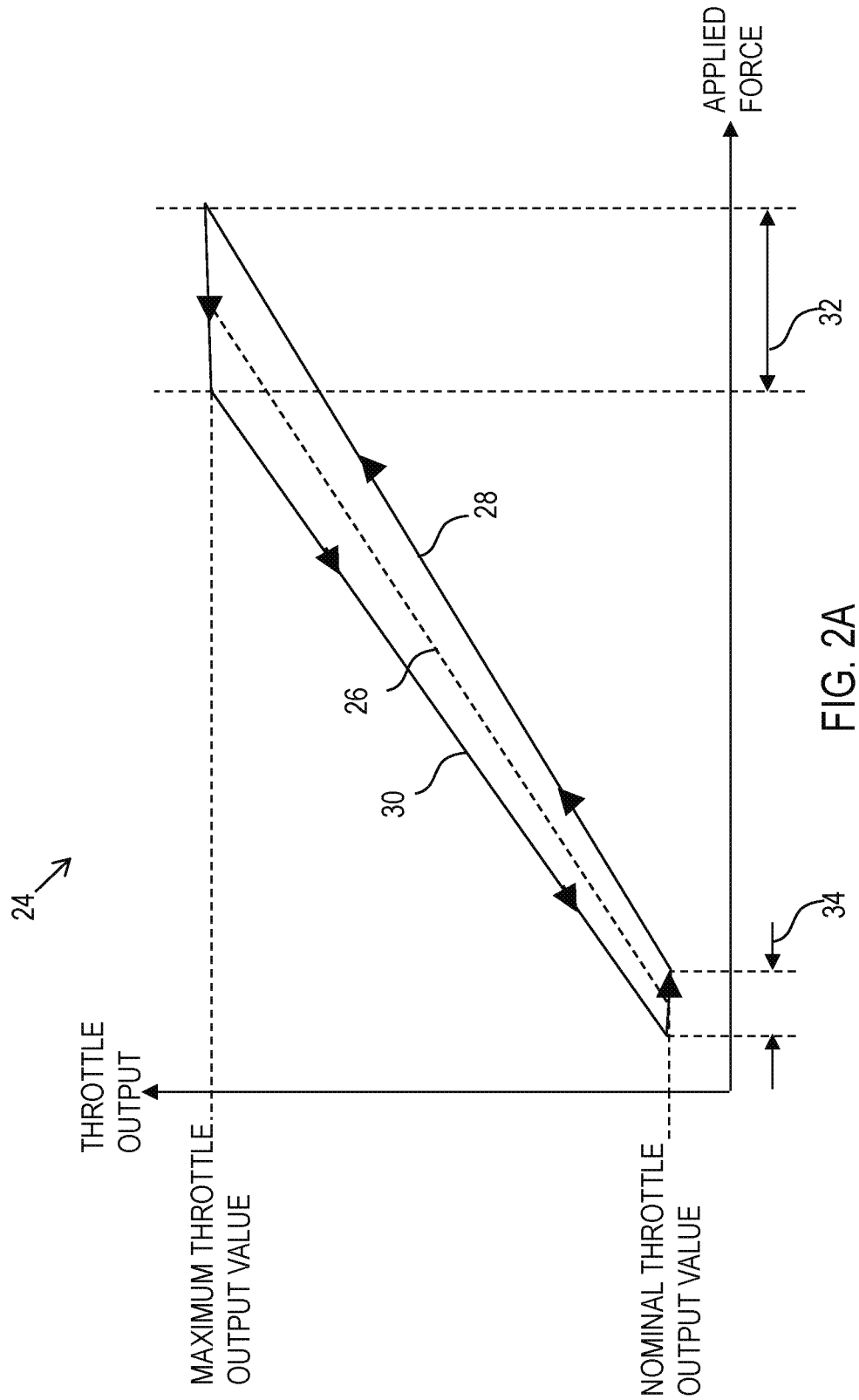
FIG. 2A presents a graph of an example hysteresis function according to aspects of the present disclosure.

FIG. 2A depicts a graph 24 of an example hysteresis function according to aspects of the present disclosure. The vertical axis represents the throttle output, and the horizontal axis represents the applied force. In some embodiments, a hysteresis function may be applied to the throttle output based on the monitored force applied to the pedal platform. Various parameters of the hysteresis function may vary based on the current applied force, a rate of change of the current applied force, and/or one or more operating parameters of the vehicle. For example, a nominal relationship curve 26 may relate the applied force to the throttle output. Applying the hysteresis function to the nominal relationship curve 26 may result in the throttle output following a first path 28 when the applied force is increasing and a second path 30 when the applied force is decreasing. The first path 28 and/or second path 30 may be defined as having respective offsets with respect to the nominal relationship 26 as measured on the throttle output and/or applied force axis. For example, in a simplified case, the first path 28 may defined as the throttle output value produced by the nominal relationship 26 plus an offset. Similarly, the second path 30 may be defined as the nominal relationship 26 produced by the nominal relationship 26 minus an offset. Each of the first path 28 and second path 30 may also have respective slopes that may be equal to or different than a slope of the nominal relationship 26. The slope and/or offset values may vary based on the current applied force, a rate of change of the current applied force, and/or one or more operating parameters.

At the maximum throttle output, a first constant throttle force range 32 may be defined. The hysteresis function may cause applied force values within the constant throttle force range 32 to result in a throttle output equal (or approximately equal) to the maximum throttle output value. Similarly, a second constant throttle force range 34 may be defined, within which the hysteresis function causes the throttle output to equal (or approximately equal) the nominal throttle output value.

FIG. 2A illustrates the nominal relation 26 as a linear relationship between the applied force and throttle output. However, it should be understood that, in some embodiments, the hysteresis function may be applied to the calculations described above with reference to FIG. 1, such as the output, U(F, C), of equation 1. In other words, in some embodiments, such output may be an intermediate output which is then input into the hysteresis function to obtain the throttle output.

Figure 2B:
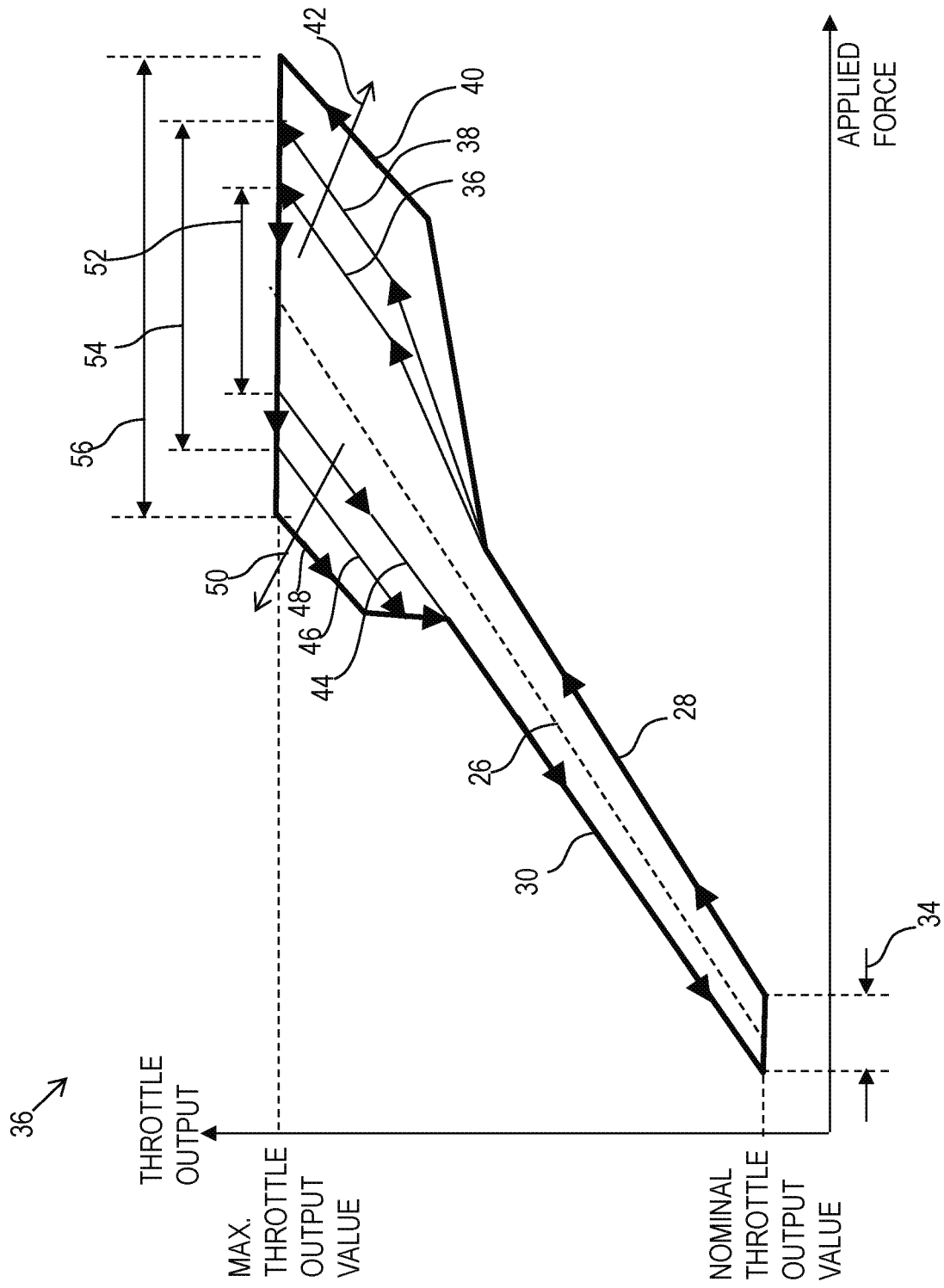
FIG. 2B presents a graph of another example hysteresis function according to aspects of the present disclosure.

FIG. 2B presents a graph 36 of an illustration of another embodiment of the hysteresis function according to aspects of the present disclosure. At least one parameter associated with the hysteresis function may vary based on an operating condition of the vehicle. Example parameters of the hysteresis function may include an offset, slope, constant throttle force range (for example as described above), and any other suitable parameters associated with hysteresis functions. In other words, the hysteresis function may cause the throttle output to diverge or converge on the nominal relationship 26 with the applied force based on the operating condition.

For example, in some embodiments, a slope associated with the hysteresis function may vary with an operating condition of the vehicle. The slope of the first path 28 and/or second path 30 of the hysteresis function may vary with the operating condition value. For instance, the first path 28 may be adjusted based on the operating condition. A series of sub-paths 36, 38, 40 may represent constant-operating condition value lines. Thus, the first path 28 may be adjusted based on increasing or decreasing operating condition values (illustrated by arrow 42). Similarly, a series of sub-paths 44, 46, 48 may represent constant-operating condition value lines, and the second path 30 may be adjusted based on increasing or decreasing operating condition values (illustrated by arrow 50).

In some embodiments, one or more constant throttle force ranges associated with the hysteresis function may vary with varying operating condition values. For example, the magnitude of the constant throttle force range may vary with the operating condition. FIG. 2B illustrates this using a series of constant throttle force ranges 52, 54, 46. A first constant throttle force range 52 may be associated with the first sub-path 36 of the first path 28 and the first sub-path 44 of the second path 30. Similarly, a second constant throttle force range 54 may be associated with the second sub-path 38 of the first path 28 and the second sub-path 46 of the second path 30, and so on.

It should be understood that the various "paths" of FIG. 2B merely illustrate simplified examples of varying a parameter of a hysteresis function according to aspects of the present disclosure. Various combinations or variations are possible within the scope of this disclosure based on the above description and examples. For instance, the "paths" of FIG. 2B are illustrated as straight line segments for clarity. In some embodiments, the hysteresis function can define "paths" including curved sections. In some embodiments, a first parameter of the hysteresis function may vary based on a first operating characteristic, and a second parameter may vary based on a second operating characteristic. For example, a slope of the hysteresis function may vary based on a current acceleration of the vehicle, while a magnitude of a constant throttle force range may vary based on a current speed of the vehicle.

Figure 3A:
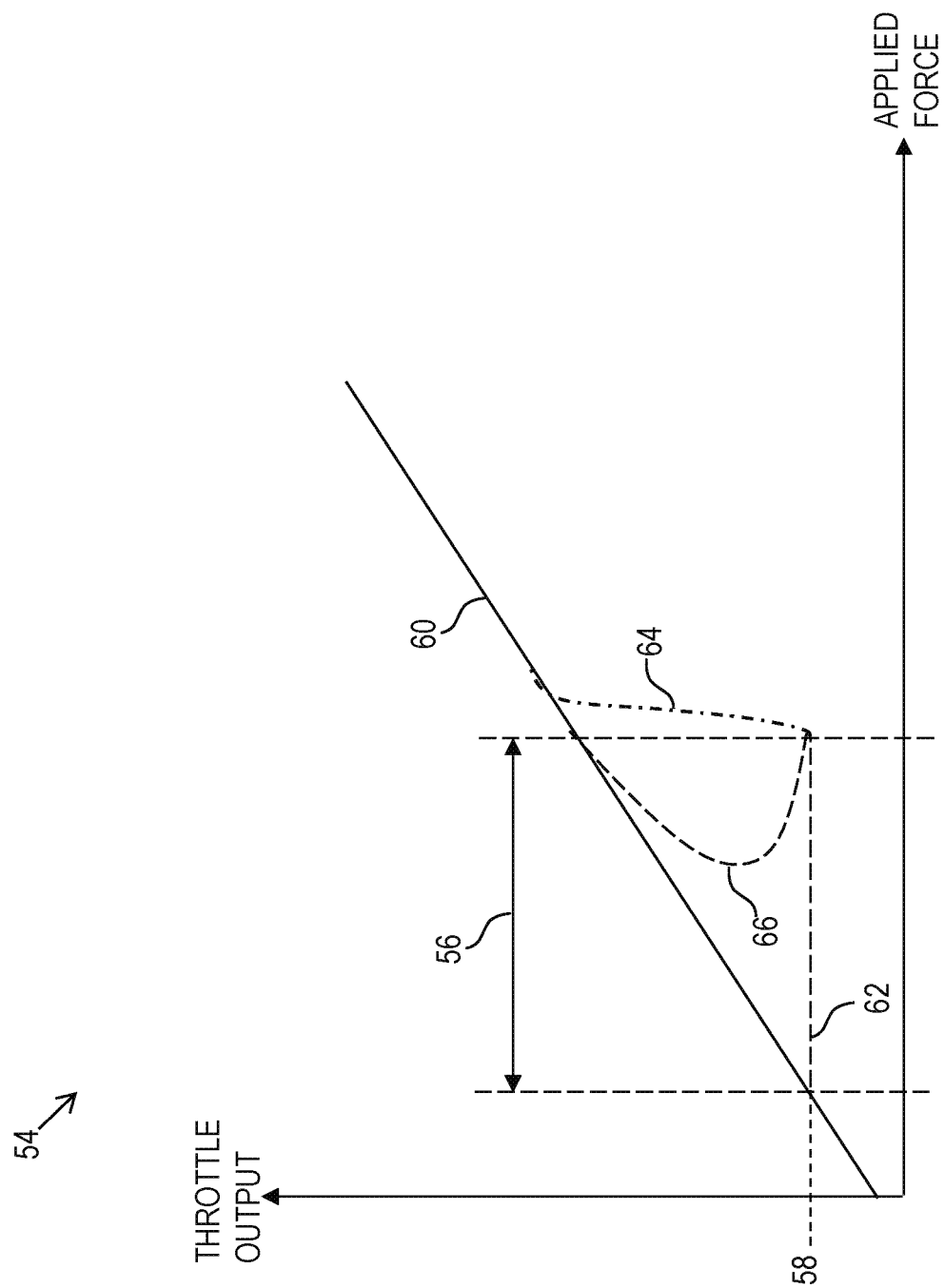
FIG. 3A presents a graph of an example threshold function according to aspects of the present disclosure.

FIG. 3A presents a graph 54 of an example threshold function according to aspects of the present disclosure. When applied, the threshold function may cause the throttle output to remain substantially constant for certain monitored force values. For example, the threshold function may define a constant throttle force range 56 and cause the throttle output to remain substantially constant at a substantially constant throttle output value 58 while the applied force is within the constant throttle force range 56. A nominal relationship 60 (shown by a solid line) may relate the applied force and the throttle output without the threshold function. The resulting throttle output within the constant throttle force range 56 is shown by dotted line 62. The other dotted lines 64, 66 illustrate how the throttle output may be smoothly returned (e.g., increased) to the throttle output produced by the nominal relationship 60 once the threshold function is no longer being applied.

FIG. 3A illustrates the nominal relation 60 as a simplified linear relationship for clarity. However, in some embodiments, the threshold function may be applied to the result of the calculations described above with reference to FIG. 1 (e.g., the output, U(F, C), of equation 1) and/or the output of the hysteresis function described above with reference to FIGS. 2A and 2B. In other words, in some embodiments, the output of such calculations may be an intermediate output which is then input into the hysteresis function to obtain the throttle output.

Figure 3B:
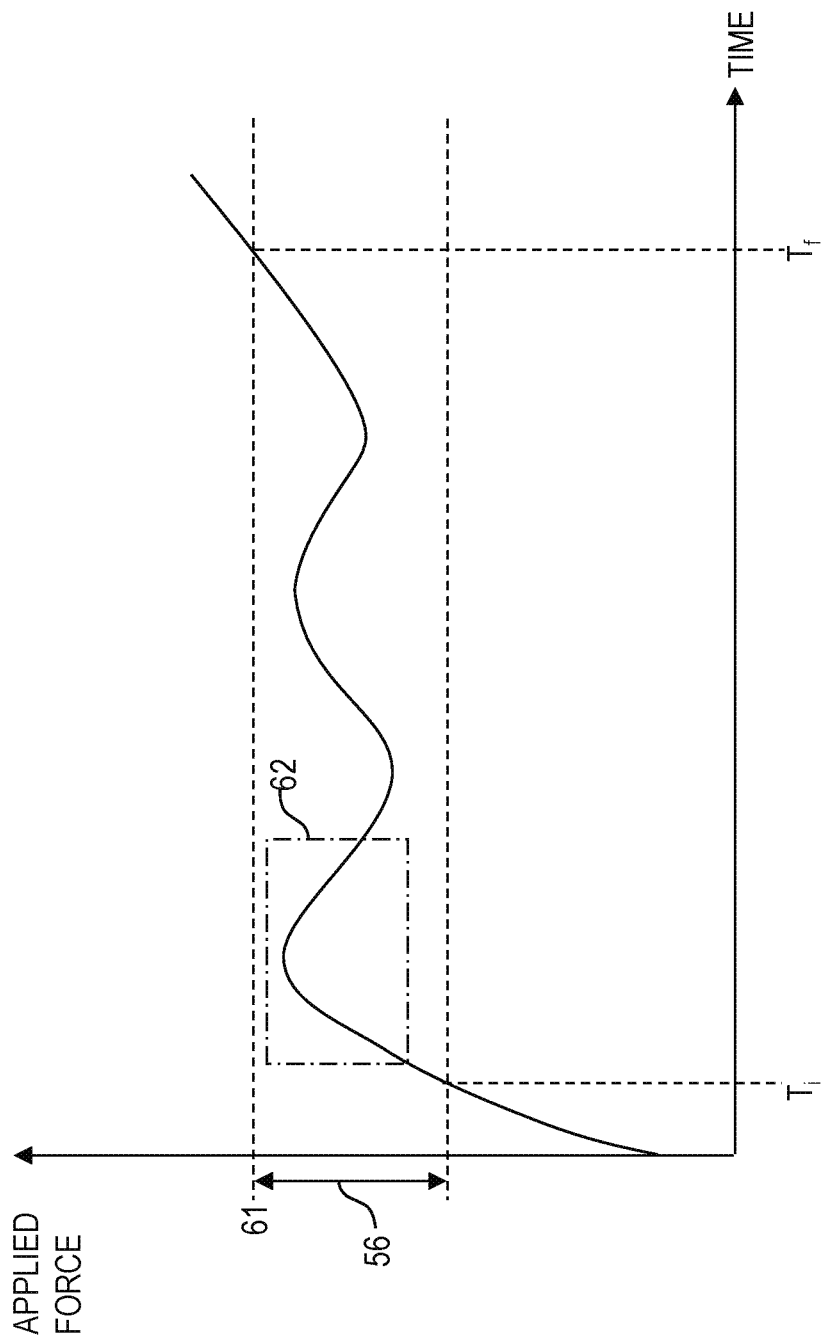
FIG. 3B presents an illustration of the threshold function of FIG. 3A according to aspects of the present disclosure.

FIG. 3B presents a graph of a time-varying example of an application of the threshold function of FIG. 3A according to aspects of the present disclosure. The applied force is represented on vertical axis, and time is represented on the horizontal axis. In this example, the applied force remains within the constant throttle force range 56 from an initial time (represented by $T_i$ in FIG. 3B) to a final time (represented by $T_f$ in FIG. 3B). During that time period, the throttle output may remain constant or substantially constant despite variations of the applied force within the constant throttle force range 56.

The driver may selectively cause the threshold function to be applied in a variety of ways. For example, the threshold function the driver may indicate that the threshold should be applied by speaking a command, manipulating a physical button or switch, or interacting with a touchscreen device in the vehicle. Additionally, in some embodiments, the threshold function may be configured to be automatically applied when the applied force remains within a predetermined force threshold for a predetermined time interval.

The driver may also selectively cause the threshold function to stop being applied in a variety of ways. For example, the driver may apply a force that is outside of the constant throttle force range 56. Referring to FIG. 3B, when the applied force exceeds an upper limit 61 of the constant throttle force range 56 at the final time (represented by $T_f$ in FIG. 3B), the threshold function may no longer be applied such that the throttle output may again be controlled based on the applied force. The driver may be able to cease application of the threshold function using any other suitable method, including applying the brake, speaking a command, manipulating a physical button or switch, or interacting with a touchscreen device in the vehicle, for example. When application of the threshold function is stopped, the throttle output may be smoothly returned to a throttle output that is based on the applied force (e.g., as described above with reference to the dotted lines 64, 66 of FIG. 3A).

In some embodiments, at least one operation of the vehicle (e.g., different from controlling the throttle of the engine) may be controlled based on variations of the monitored force that are within the constant throttle force range 56 while the threshold function is being applied. Example operations of the vehicle include providing an input to an autonomous driving system, adjusting a driving mode of the vehicle, shifting a gear of a transmission of the vehicle, applying a brake of the vehicle, and/or activating a turn signal based on aspects of the force distribution. For instance, while the threshold function is applied, the driver may be able to apply a short pulse of force (represented by dotted box 62) to shift to a lower or higher gear (e.g., without affecting the throttle output). As another example, the driver can apply two pulses to activate a turn signal. Other variations and/or combinations are possible within the scope of the disclosure.

FIG. 4 is a simplified schematic illustration of a system 100 that includes an electronic pedal assembly 102 for a vehicle according to aspects of the present disclosure. The system 100 may also include an engine 104 including an actuator 106 configured to control the operation of a throttle 108, which may adjust a rate of air and/or fuel to the engine. It should also be understood, however, that the currently disclosed system and associated methods may also be used in electric and/or hybrid vehicles. In such instances, the system may include an electric motor (e.g., instead of or in addition to the engine 104). A voltage and/or current applied to the electric motor may be controlled based on the throttle output. For example, the system may control the torque output by the engine and/or motor based on the throttle output.

In some embodiments, the system 100 may also include a transmission 109 configured to transmit power from the engine 104 of the vehicle to wheels of the vehicle. In some embodiments, the transmission 109 may be configured as an automatic transmission, and the control device(s) 114 may be configured to control the transmission 109, including shifting between gears of the transmission.

It should be understood that a separate control device may be configured to control the operation of the engine 104 and/or transmission 109 and that the control device 114 of the electronic pedal assembly 102 may be communicatively coupled with the separate control device instead of (or in addition to) being directly communicatively coupled with one or more of the force sensor(s) 112, actuator 106 of the engine 104, and/or transmission 109. In other embodiments, the control device(s) 114 illustrated in FIG. 4 may represent a central or main control device of the vehicle, and the vehicle may not include a separate control device for the electronic pedal assembly 102. It should be understood that yet other variations or combinations are possible within the scope of this disclosure.

The electronic pedal assembly 102 may include a pedal platform 110 and at least one force sensor 112 configured to measure a force applied to the pedal platform 110 and/or a force distribution on the pedal platform 110. The pedal assembly 102 also may include one or more control devices 114 communicatively coupled to the force sensor(s) 112.

In general, the control device(s) 114 may correspond to any suitable processor-based device(s), such as a computing device or any combination of computing devices. The control device(s) 114 may include one or more processor(s) 116 and associated memory device(s) 118 configured to perform a variety of computer-implemented functions, such as generate a throttle output for controlling the throttle of the engine 104 or adjust an operation of the vehicle based on a force distribution on the pedal platform 102. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the control device(s) 114 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 110 may generally be configured to store suitable computer-readable instructions that, when implemented by the processor(s) 108 configure the control device(s) 114 to perform various computer-implemented functions, such as one or more aspects of a method 200 for controlling a throttle of an engine of a vehicle as described below with reference to FIG. 8A or a method 300 for adjusting an operation of the vehicle based on a force distribution on a pedal platform as described below with reference to FIG. 8B.

Figure 5A:
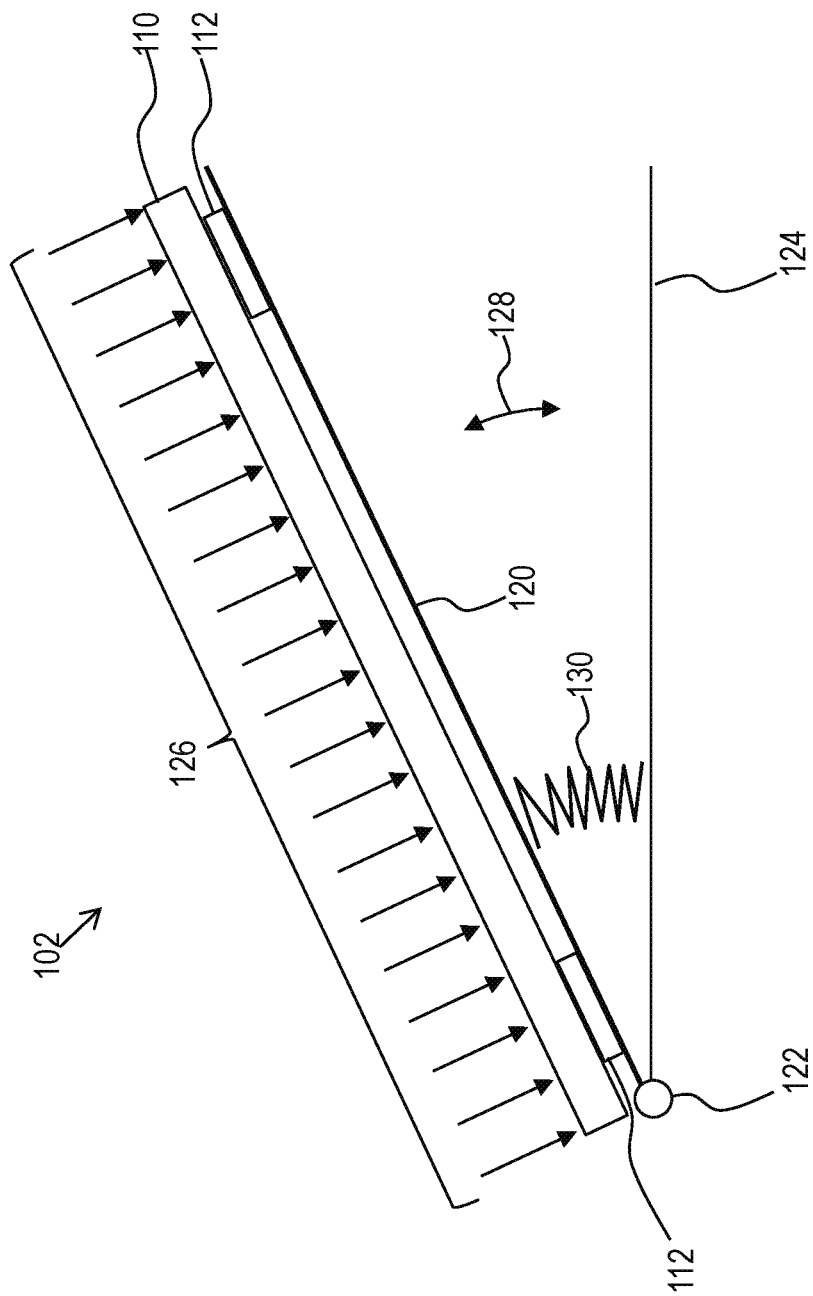
FIG. 5A is a side elevation view of select portions of an embodiment of the electronic pedal assembly of FIG. 4.

FIG. 5A is a side elevation view of select portions of an embodiment of the electronic pedal assembly 102 of FIG. 4. The pedal assembly 102 may include a pedal substrate 120 and an attachment point 122 coupling the pedal substrate 120 to a base structure 124. For example, the base structure 124 may include a portion of a floorboard of the vehicle, a portion of a sub-floor structure of the vehicle, a portion of a frame element of the vehicle, or the like. The pedal platform 110 may be coupled with the pedal substrate 120, and the force sensor(s) 112 may be configured to measure a total force and/or a force distribution (represented by arrows 126) applied to the pedal platform 110. For example, the force sensor(s) may be arranged between the pedal platform 110 and the pedal substrate 120.

In some embodiments, the attachment point 122 may be configured as a pivotal attachment, such as a hinge. The pedal platform 110 and pedal substrate 120 may rotate about the attachment point 122 (represented by arrow 128) in response to the applied force (represented by arrows 126) to the pedal platform 110. A return spring 130 may be configured to exert a force on the pedal substrate 120 to return the pedal substrate 120 and the pedal platform 110 to a starting position. In alternative embodiments, the pedal platform 110 may be rigidly affixed to the base structure 124. In such embodiments, the pedal platform 110 may remain stationary when the driver applies a force to the pedal platform 110.

Figure 5B:
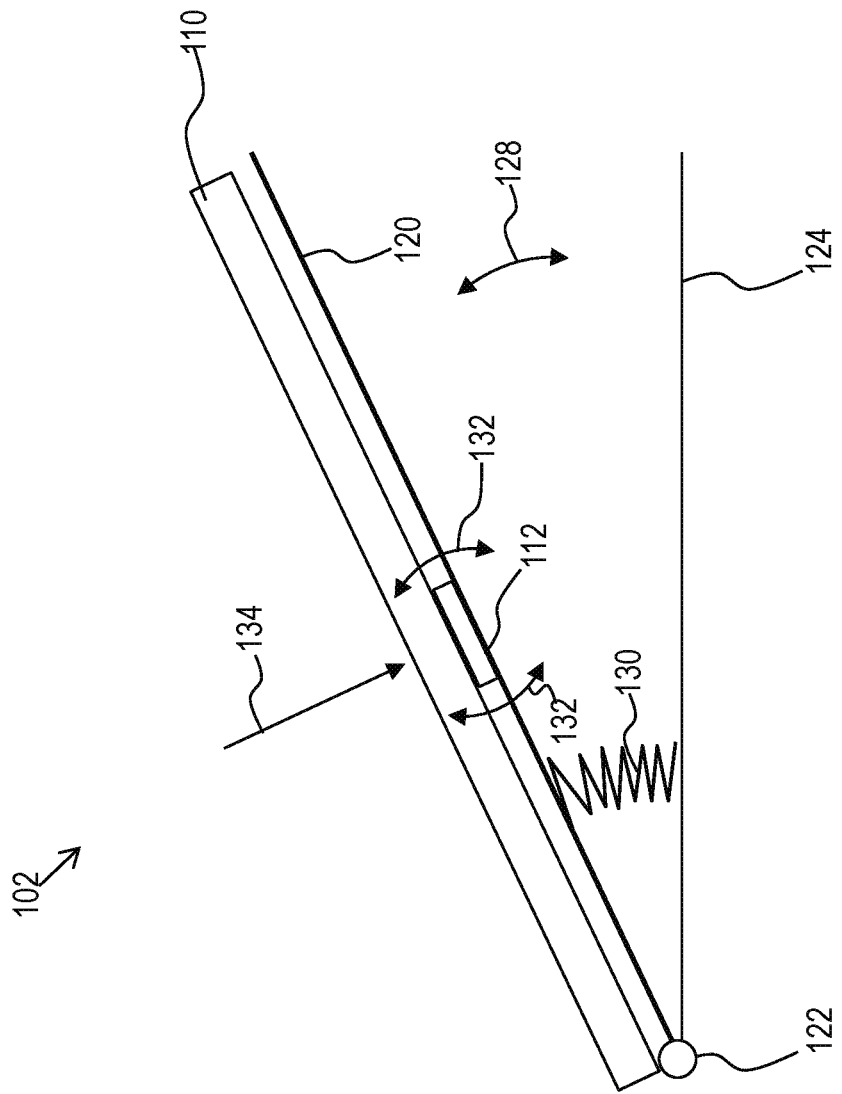
FIG. 5B is a side elevation view of select portions of another embodiment of the electronic pedal assembly of FIG. 4.

FIG. 5B is a side elevation view of select portions of another embodiment of the electronic pedal assembly 102 of FIG. 4. In some embodiments, the force sensor 112 may be configured to measure a torque (illustrated by arrows 132) and/or a point load 134 applied to the pedal platform 110.

FIG. 6 illustrates a simplified schematic top down view of the select portions of the pedal assembly 102 of FIG. 3. In some embodiments, the pedal assembly 102 may include a pair of three or more force sensors such that a force distribution applied to the pedal platform 110 can be monitored in two dimensions. For example, the pedal platform 110 may have a longitudinal direction 136 and a lateral direction 138 that is perpendicular to the longitudinal direction 136. A longitudinal axis 140 may extend in the longitudinal direction 136, and a lateral axis 142 may extend in the lateral direction 138. A first force sensor 144 may be spaced apart from a second force sensor 146 in the lateral direction 138, such that the first and second force sensors 144, 146 may be configured to measure a force distribution on the pedal platform with respect to the lateral direction 138. A third force sensor 148 may be spaced apart from the first and/or second force sensors 144, 146 in the longitudinal direction 136 such that the third force sensor 148 in combination with at least one of the first force sensor 144 or second force sensors 146 may be configured to measure a force distribution on the pedal platform with respect to the longitudinal direction 136.

The control device(s) 114 may be configured to measure or calculate a torque (illustrated by arrow 150) about the longitudinal axis 140 and/or a torque (illustrated by arrow 152) about the lateral axis 142. For example, in some embodiments, the control device(s) 114 may be configured to calculate the torque(s) 150, 152 based on signals received from the force sensors 144, 146, 148 in combination with the information about the physical locations of the force sensors 114, 146, 148 relative to a center of the pedal platform 110. In other embodiments, at least one of the force sensors 144, 146, 148 may be configured to sense and generate signals indicative of the torque 150, 152. It should be understood that, in some embodiments, a single force and/or torque sensor 112 may be used, for example as described above and illustrated in FIG. 5B.

In some embodiments, the control device(s) 114 may be configured to determine the throttle output based on aspects (e.g., a longitudinal or lateral concentration) of the force distribution applied to the pedal platform 110. For example, a force distribution that is more concentrated towards a forward end 154 with respect to the longitudinal direction 136 (e.g., under toes of the driver's foot) of the pedal platform 110 may result in a greater throttle output than a force distribution of equal overall magnitude that is more concentrated towards a rearward end 156 with respect to the longitudinal direction 136 (e.g., under a heel of the driver's foot) of the pedal platform 110. In other words, the driver may be able to control the throttle output by varying how the driver distributes the force on the pedal platform 110.

In some embodiments, the control device(s) 114 may be configured to adjust an operation of the vehicle (e.g., different from controlling the throttle of the engine 104) based on aspects (e.g., a longitudinal and/or lateral concentration and/or torque) associated with the force distribution that is applied to the pedal platform 110. As examples, the control device(s) 114 may be configured to provide an input to an autonomous driving system, adjust a driving mode of the vehicle, shift a gear of a transmission of the vehicle, apply a brake of the vehicle, and/or activate a turn signal based on aspects of the force distribution.

As an example, the control device(s) 114 may be configured to shift the transmission 109 of the vehicle in response to aspects of the force distribution. The control device(s) 114 may be configured to shift the transmission 109 (or instruct a separate control device to shift the transmission 109) to a higher gear when a force distribution is applied to the pedal platform 110 that is laterally concentrated towards a right side 158 of the pedal platform 110. Similarly, the control device(s) 114 may be configured to shift the transmission 109 (or instruct a separate control device to shift the transmission 109) to a lower gear when a force distribution is applied to the pedal platform 110 that is laterally concentrated towards a left side 160 of the pedal platform 110.

Additional examples include activating a left turn signal in response to a force distribution having a lateral concentration to the left side 160 of the pedal platform 110, applying a brake of the vehicle in response to a force distribution having a longitudinal concentration towards the rearward end 156 of the pedal platform 110, entering a "sport" mode in response to a force distribution having a longitudinal concentration towards the forward end 154 of the pedal platform 110, entering a "comfort" mode in response to a force distribution having a longitudinal concentration towards the rearward end 156 of the pedal platform 110, etc. It should be understood that any suitable variation or combination is within the scope of this disclosure.

In some embodiments, the control device(s) 114 may be configured to communicate an instruction to an autonomous driving system of the vehicle based on aspects of the force distribution. As used herein, autonomous driving system refers to any system configured to control driving operations of the vehicle in an autonomous or semi-autonomous manner. Such operations may include maintaining the vehicle within a lane while driving on a highway, stopping, turning, navigating the vehicle from an origin to a destination without driver input or with minimal driver input. For example, a the control device(s) 114 may be configured to transmit an instruction to the autonomous driving system to adjust (e.g., increase or decrease) a cruising speed of the vehicle in response to a force distribution having a longitudinal concentration towards the forward end 154 or rearward end 156 of the pedal platform 110. As another example, the control device(s) 114 may be configured to transmit an instruction to the autonomous driving system to change lanes in response to a force distribution having a lateral concentration towards the right side 158 or the left side 160 of the pedal platform 110. It should be understood that yet further combinations and/or variations are possible within the scope of this disclosure based on the description and examples provided herein.

FIG. 7A illustrates a pedal assembly 164 in an unassembled state. The pedal assembly 164 can include a body 166 having an arm 167 and a base 169. The pedal assembly 164 can also include a force sensor 168. The pedal 166 can define a notch 174 in which the force sensor 168 can be received (as illustrated by arrow 172). The pedal 166 can also include a slot 174.

Figure 7B:
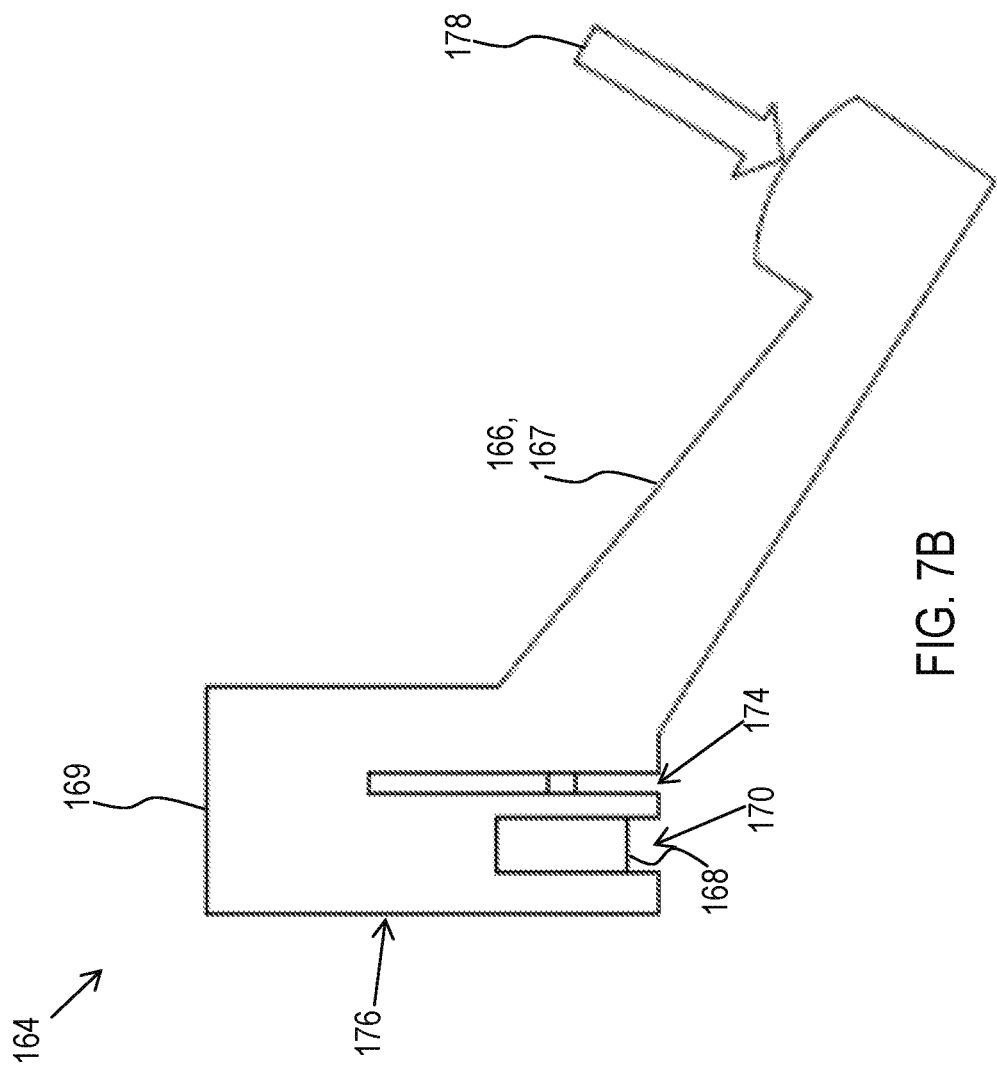
FIG. 7B illustrates the pedal assembly of FIG. 7A in an assembled state according to aspects of the present disclosure.

FIG. 7B illustrates the pedal assembly 164 in an assembled state. When a force (illustrated by arrow 178) is applied to the arm 167 of the body 166 of the pedal assembly 164, the base 169 of the body 166 may deform such that the force sensor 168 is compressed. The force sensor 168 can correspond with the force sensor(s) 112 of FIG. 3.

Figure 8A:
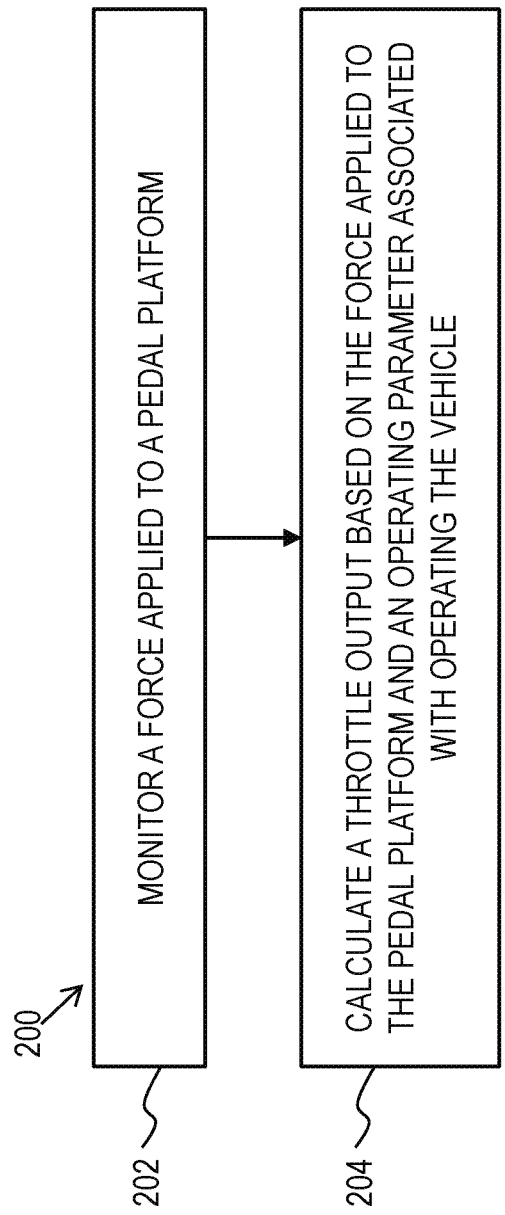
FIG. 8A illustrates a flow diagram of an embodiment of a method for calculating a throttle output according to aspects of the present disclosure.
Figure 8B:
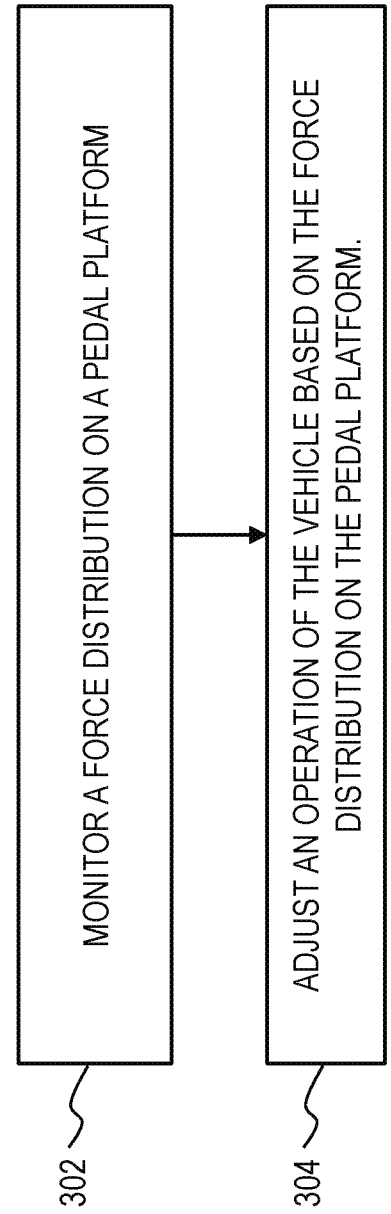
FIG. 8B illustrates a flow diagram of an embodiment of a method for adjusting an operation of the vehicle based on a force distribution on a pedal platform according to aspects of the present disclosure.

FIGS. 8A and 8B illustrate flow diagrams of embodiments of methods 200, 300 for adjusting an operation of the vehicle based on a force distribution on a pedal platform according to aspects of the present disclosure. Although FIGS. 8A and 8B depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the methods 200, 300 may be described herein with reference to the pedal assembly 102 described above. However, it should be appreciated that the disclosed method 200 may be used to control a throttle condition of a vehicle having any other suitable configuration.

Referring to FIG. 8A, the method 200 may include, at (202), monitoring a force distribution on a pedal platform 110. For example, the control device(s) 114 may be configured to calculate one or more of the following: a total force applied to the pedal platform 110, a location of a single point load which would be equivalent to the force distribution, a torque about one or more the lateral or longitudinal axis, etc.

The method 200 may include, at (204), calculating a throttle output based on the force applied to the pedal platform 110 and an operating parameter associated with operating the vehicle, for example as described above with reference to FIG. 2A.

Referring to FIG. 8B, the method 300 may include, at (302), monitoring a force distribution on the pedal platform 110. The method 300 may include, at (304), adjusting an operation of the vehicle based on the force distribution applied to the pedal platform 110. For example, the operation of the vehicle may be adjusted based on a longitudinal or lateral concentration of the force distribution. In some embodiments, adjusting the operation of the vehicle may include determining a throttle output for controlling the throttle 108 of the engine 104 of the vehicle, for example as described above with reference to FIG. 6. In some embodiments, adjusting the operation of the vehicle may include adjusting an operation that is different from controlling the throttle condition of the vehicle, for example as described above with reference to FIG. 6. Examples of such operations include providing an input to an autonomous driving system, adjusting a driving mode of the vehicle, shifting a gear of a transmission of the vehicle, applying a brake of the vehicle, and/or activating a turn signal based on aspects (e.g., a longitudinal or lateral concentration) of the force distribution.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An electronic pedal assembly for controlling a throttle condition of a vehicle, the electronic pedal assembly comprising:
a pedal platform;
at least one force sensor configured to sense a force applied to the pedal platform;
one or more control devices communicatively coupled to the at least one force sensor and configured to determine a throttle output for controlling the throttle condition of the vehicle based at least in part on the force applied to the pedal platform and based at least in part on an operating condition associated with operating the vehicle, wherein the one or more control devices are further configured to selectively apply a threshold function to the monitored force to determine the throttle output, the threshold function comprising:
defining a constant throttle force range; and
causing the throttle output to be remain substantially constant while the applied force is within the constant throttle force range; and
adjusting a second operation of the vehicle based on variations of the monitored force that are within the constant throttle force range, the second operation being different from controlling the throttle condition of the vehicle.

2. The electronic pedal assembly of claim 1, wherein the operating condition comprises at least one of a current speed of the vehicle, a current acceleration of the vehicle, a current road condition, or a driving mode of the vehicle.

3. The electronic pedal assembly of claim 1, wherein the one or more control devices are further configured to compute at least one of a gain or an offset that relates the monitored force with the throttle output to determine the throttle output, and wherein the at least one of the gain or the offset varies with the operating condition.

4. The electronic pedal assembly of claim 1, wherein the one or more control devices are further configured to determine the throttle output based at least in part on a monotonous function.

5. The electronic pedal assembly of claim 1, wherein the one or more control devices are further configured to apply a hysteresis function to determine the throttle output.

6. The electronic pedal assembly of claim 5, wherein the one or more control devices are further configured to vary at least one parameter associated with the hysteresis function based on the operating condition.

7. The electronic pedal assembly of claim 1, wherein:
the at least one force sensor is configured to measure a force distribution on the pedal platform; and
the one or more control devices are further configured to adjust a second operation of the vehicle based on the force distribution on the pedal platform, the second operation being different from controlling the throttle condition of the vehicle.

8. The electronic pedal assembly of claim 7, wherein the second operation comprises one or more of:
providing an input to an autonomous driving system;
adjusting a driving mode of the vehicle;
shifting a gear of a transmission of the vehicle;
applying a brake of the vehicle; or
activating a turn signal.

9. The electronic pedal assembly of claim 7, wherein the at least one force sensor comprises at least one of the following:

a pair of force sensors spaced apart in at least one of a longitudinal direction or a lateral direction with respect to the pedal platform; or a torque sensor configured to sense a torque about at least one of a longitudinal axis or lateral axis of the pedal platform.

10. The electric pedal assembly of claim 1, wherein second operation comprises one or more of:
providing an input to an autonomous driving system;
adjusting a driving mode of the vehicle;
shifting a gear of a transmission of the vehicle;
applying a brake of the vehicle; or
activating a turn signal.

11. The electric pedal assembly of claim 1, wherein the one or more control devices are configured to select the nominal force value based on a driver input.

12. An electronic pedal assembly for a vehicle comprising:
a pedal platform having a longitudinal direction and a lateral direction;
at least one force sensor configured to measure a force distribution with respect to at least one of the longitudinal direction or the lateral direction on the pedal platform;
one or more control devices communicatively coupled to the at least one force sensor, the one or more control devices configured to monitor the force distribution on the pedal platform with respect to at least one of the longitudinal direction or the lateral direction by receiving signals from the at least one force sensor and adjust an operation of the vehicle based on the force distribution on the pedal platform, wherein the one or more control devices are further configured to selectively apply a threshold function to the monitored force to determine the throttle output, the threshold function comprising:
defining a constant throttle force range; and
causing the throttle output to be remain substantially constant while the applied force is within the constant throttle force range; and
adjusting a second operation of the vehicle based on variations of the monitored force that are within the constant throttle force range, the second operation being different from controlling the throttle condition of the vehicle.

13. The electronic pedal assembly of claim 12, wherein the operation of the vehicle comprises one or more of:
providing an input to an autonomous driving system;
adjusting a driving mode of the vehicle;
shifting a gear of a transmission of the vehicle;
applying a brake of the vehicle; or
activating a turn signal.

14. The electronic pedal assembly of claim 12, wherein the operation of the vehicle comprises determining a throttle output for controlling a throttle condition of the vehicle.

15. The electronic pedal assembly of claim 12, wherein the one or more control devices are configured to determine the throttle output based additionally on a current operating condition of the vehicle.

16. The electronic pedal assembly of claim 15, wherein the current operating condition of the vehicle comprises at least one of a current speed of the vehicle, a current acceleration of the vehicle, a current road condition, or a current driving mode of the vehicle.

17. The electronic pedal assembly of claim 12, wherein the at least one force sensor comprises a pair of force sensors spaced apart in at least one of the longitudinal direction or the lateral direction of the pedal platform.

18. The electronic pedal assembly of any of claim 12, wherein the at least one force sensor comprises a torque sensor configured to sense a torque about at least one of a longitudinal axis extending in the longitudinal direction or a lateral axis extending in the lateral direction of the pedal platform.

* * * * *